United States Patent [19]

Hailey

[11] 4,383,436
[45] May 17, 1983

[54] PIPE TESTER

[76] Inventor: Charles D. Hailey, Oklahoma City, Okla.

[21] Appl. No.: 227,915

[22] Filed: Jan. 23, 1981

[51] Int. Cl.³ ............................................. G01M 3/28
[52] U.S. Cl. ........................................ 73/46; 73/49.1
[58] Field of Search ......................... 73/46, 49.1, 49.5

[56] References Cited

U.S. PATENT DOCUMENTS

| 2,264,515 | 12/1941 | Fear | 73/46 |
|---|---|---|---|
| 2,587,192 | 2/1952 | Meyer | 73/46 |
| 2,761,311 | 9/1956 | Baker | 73/46 |
| 3,034,339 | 5/1962 | Gawlik | 73/46 |
| 3,490,525 | 1/1970 | Nettles | 73/46 X |
| 4,136,552 | 1/1979 | Hasha | 73/46 |
| 4,152,926 | 5/1979 | Hasha | 73/46 |
| 4,194,389 | 3/1980 | Laging | 73/46 |

OTHER PUBLICATIONS

*Heavy Duty Blowout Preventers*, Bowen Tools, Inc. publication Manual No. 5/8505, pp. 1-13, Jun. 1978.

*Primary Examiner*—Edward R. Kazenske
*Assistant Examiner*—Joseph W. Roskos
*Attorney, Agent, or Firm*—Browning, Bushman, Zamecki & Anderson

[57] ABSTRACT

A system for externally testing a pipe joint connection utilizes a well known oil field apparatus with minor modifications to perform an important test of the hydraulic integrity of the pipe joint. A pair of hydraulically operated blowout preventor rams are connected by means of a pipe of sufficient length to accommodate the enclosure of a pipe joint connection. The connecting pipe forming the enclosure is aligned with the pipe opening in the rams. Thus the assembly is comprised of upper and lower rams with a pipe therebetween forming a test chamber. The lower rams are inverted so that the rams are closed, the connecting pipe forms a sealed chamber. A port is provided in the connecting pipe to permit fluid under pressure to be passed into the chamber when the rams are closed about pipe being tested. The test assembly is connected by a flange below the lower ram to the wellhead. As a string of pipe is passed into the well, the pipe joint connections are positioned in the chamber, the rams are closed, and fluid pressure is applied externally to the pipe joint. Measurement of fluid pressure decay determines if a leak exists.

14 Claims, 3 Drawing Figures

PIPE TESTER

BACKGROUND OF THE INVENTION

This invention pertains to an external testing system and more particularly to an external pipe testing system utilizing hydraulic blowout preventor rams in a pipe test configuration.

Various tools have been developed for externally testing a pipe joint connection particularly for use with oil well pipe or tubing. As the drilling of oil wells has become more expensive due to increased costs and the hazardous conditions that exist in many current drilling operations, the need for such testing has increased. In drilling operations, the need to leak-proof connections is amplified by such factors as cost of drilling and environmental considerations. For the most part, in recent years the depth of drilling has increased on the average well and this generally means as increase in the pressures encountered. As pressures increase so do the opportunities for leaks in casing, tubing, and snubbing operations and for washouts in drill pipe tool joints. Such leaks can cause lost production time, drilling delays, costly repairs, injury to workers etc.

In a snubbing operations, a string of pipe is forced into a wellbore under pressure, for example, to remove an obstruction in the well, to inject fluids into a well, etc. Blowout preventors are used to seal around the pipe being inserted into the wellbore to prevent any pressurized fluid from escaping around the outside of the string of pipe. The body of individual segments of pipe comprising the string of pipe to be snubbed are usually rack-tested prior to use to make sure that there are no leaks in the body of the pipe. However, as the connections between the various pipe sections are madeup and snubbed into the well, they are usually immediately subjected to high external pressures. The previously described rack testing will not detect a leak that exists in the pipe joint connections between pipe sections. Such a leak creates very hazardous working conditions at the well site in that high pressure fluid may flow from inside the wellbore through a leak in the pipe to the interior of the pipe and upwardly through the string of pipe being snubbed into the well. If such a leak occurs, regardless of danger to workers, such pipe leak must be corrected, which is an expensive operation when the leak occurs downhole.

In workover operations, many times an obstruction in the well has caused high pressures to be confined to a lower section of the wellbore. When a tool on the end of a pipe string breaks through such an obstruction, the entire string of pipe is subjected to the well pressure which can be of a high magnitude. Such fluid under pressure will find leaks in the pipe and be transmitted to the surface through the pipe string.

Another use for pipe testing occurs prior to drill stem testing, which relies on the integrity of the pipe string to test the pressure of a formation. If a drill pipe is leaking, it is not known whether the formation pressure is depleting or the pipe is leaking. Pipe leaks can also cause tool joint washouts which can be an expensive condition to correct.

Various external pipe testing systems have been used with varying degrees of success. Many such systems are bulky and cumbersome and thus are unsuitable for use in the limited space available at the wellhead when pipe is being inserted into a wellbore. Those devices which are hinged to wrap around the pipe often fall into this category. Other systems do not lend themselves to speed of operation, particularly where the testing is performed as the pipe is being run into an oil or gas well. Still others may not be effective in sealing completely and effectively to hold such seal under high pressures. Systems which pertain directly to the general type of pipe testing that is the subject of this application are shown in U.S. Pat. Nos. 3,034,339; 3,478,577; 3,713,521; 3,871,209; 3,921,437; 4,010,633; 4,136,552; and 4,152,926. Other testing systems which involve blowout prevention type apparatus used as such are shown in U.S. Pat. Nos. 3,872,713 and 4,090,395. None of these patents however utilize blowout preventor type devices in a test configuration such as disclosed in this application.

These prior devices each incorporate features which render them less than desirable for the general use of this technique in many instances. Many are complicated to manufacture and maintain. Some are cumbersome to use and thus undesirable because of the time and difficulty associated with their use. Because of the importance of testing pipe on a more universal basis it is desirable to provide an inexpensive simple system which is easy and fast to use and economically justifiable for general use.

It is therefore an object of the present invention to provide a new and improved external pipe testing system which is economical to manufacture, simple to use and maintain, and uncumbersome and fast to operate at the wellhead.

SUMMARY OF THE INVENTION

With this and other objects in view, the present invention contemplates an external pipe connection testing system employing two ram type blowout preventors arranged in a spaced apart upper and lower configuration with a tubular sleeve connected between the blowout preventors. The lower ram is inverted so that the upper and lower rams seal off the ends of the sleeve. A pipe string having a pipe joint connection is moved through pipe openings in the rams and the aligned tubular sleeve until the pipe joint connection is positioned in the sleeve whereupon the rams are simultaneously closed about the pipe above and below the joint to be tested. Fluid under pressure is introduced into a port in the sleeve and monitored for pressure decay in the sleeve about the joint to determine the integrity of the pipe connection.

BRIEF DESCRIPTION OF THE DRAWINGS

FIG. 3 is a partial cross sectional view of the rams taken along line 3—3 of FIG. 2, showing the rams closed about the pipe.

DESCRIPTION OF THE PREFERRED EMBODIMENTS

Figure 1:
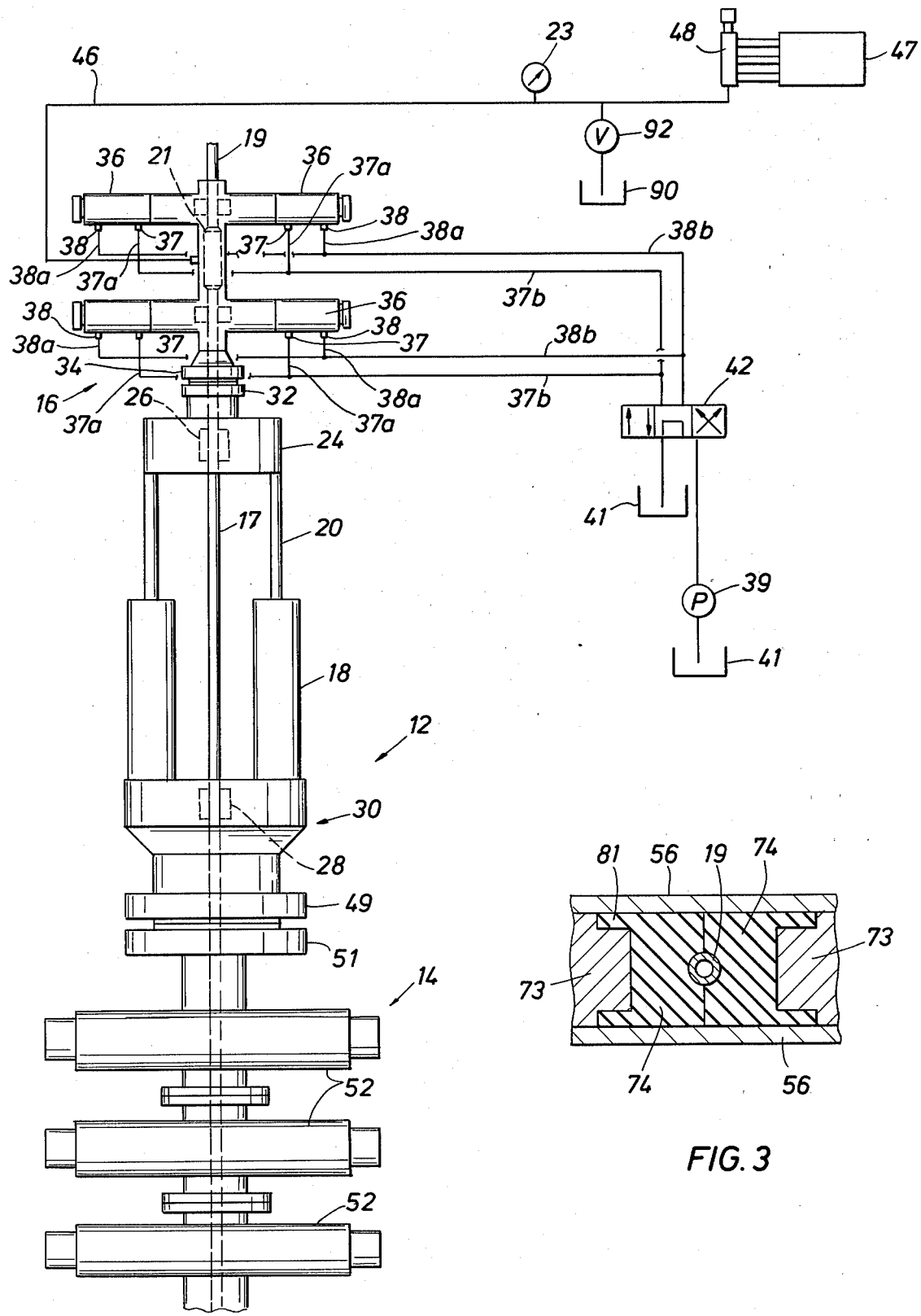
FIG. 1 shows a schematic drawing of a system for externally testing pipe joint connections in accordance with the present invention on a snubbing set up at a wellhead.

Referring first to FIG. 1 of the drawings, a snubbing unit 12 is shown positioned on top of a blowout preventor stack 14 at the upper end of a wellhead. An external testing system assembly 16 in accordance with the present invention, is positioned at the upper end of the snubbing unit 12. The hydraulic snubbing unit 12 is one typically used in pipe snubbing operations and includes a hydraulic jack which is comprised of four hydraulic cylinders, two of which are shown at 18, arranged about the vertical axis of the unit. Piston rods 20 operating in the cylinders 18 are attached to a traveling plate 24 which contains a traveling upper slip assembly 26. Stationary lower slips 28 are attached to a base structure 30 of the jack.

A flange 32 is formed on top of the upper slip assembly and is arranged to mount a flange 34 on the bottom of the external test assembly 16. The test assembly has four rams 36 arranged in two opposed pairs about the vertical axis of the assembly. The bottom pair of rams is inverted from its usual configuration as a blowout preventor to seal the space within a sleeve 43 connected between the pairs of rams. Each ram has hydraulic fittings 37 and 38 for opening and closing the rams respectively and which are connected to a fluid pressuring source by means of respective hydraulic lines 37a, 37b and 38a, 38b. The fluid pressuring source includes a gear pump 39, fluid reservoirs 41, and a motor controlled spool valve 42. This fluid pressure apparatus is arranged to deliver fluid under pressure to fittings 38 to close the hydraulic rams 36 and to deliver fluid under pressure to fittings 37 to open the hydraulic rams.

The tubular sleeve 43, which is positioned between the pairs of opposed rams has a length corresponding to or slightly longer than the length of a pipe joint connection. A pressure fitting is positioned within a port 44 in the wall of sleeve 43 and permits a hydraulic fluid under pressure from a reservoir 90 via a valve 92 to be transmitted to the interior of the sleeve 43 between the pairs of rams 36. The fitting 44 is connected to a hydraulic line 46 which in turn connects with hydraulic pumps 47 such as a triplex plunger pump. A preset relief valve 48 prevents pressure on the line 46 from exceeding a preselected pressure limit.

At the lower end of the snubber unit 12, a flange 49 at the bottom of the base structure 30 couples with a flange 51 on the upper end of a blowout preventor stack 14. A series of blowout preventors 52 are mounted in series at the upper end of a wellhead.

Figure 2:
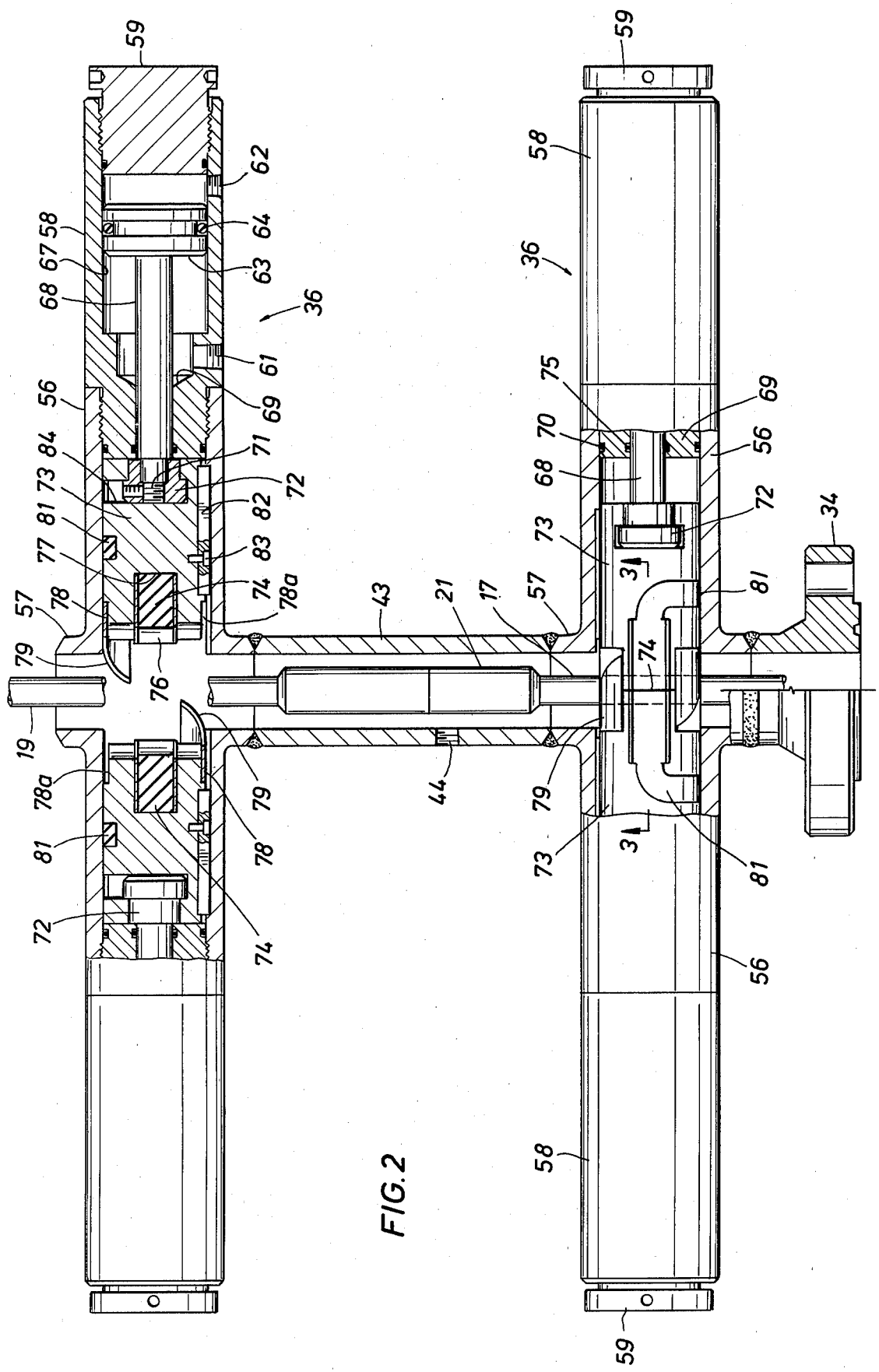
FIG. 2 shows a cross sectional view of a pipe test system utilizing ram type blowout preventors arranged in a pipe joint test configuration in accordance with the present invention.

Referring next to FIG. 2 of the drawings, the rams 36, arranged in the external pipe test configuration of the pipe test assembly 16, are shown in greater detail. Referring to the upper pair of rams, a pair of mating rams 13 are arranged in opposition to one another so that, when actuated, they close toward one another to seal about a pipe passing therethrough. Although in actual operation all four rams would be opened and closed simultaneously, for purposes of illustration, the closed portion is shown in the cut away view of the bottom rams in FIG. 2. Each ram is mounted in a horizontally disposed body portion 56 extending outwardly from a vertical body portion 57. The body portion 56 is connected to an adapter cylinder 58 forming an extension of the body portion 56. The end of the cylinder 58 is fitted with a blind end cap 59. Ports 61 and 62 in the cylinder connect with fittings 37 and 38 respectively (FIG. 1) to provide means for communicating hydraulic fluid to either side of a piston 63 movably received within cylinder 58. A piston seal 64 provides a seal between the piston and inner wall 67 of the cylinder 58. An integral rod 68 extends from the piston through the inner end wall 69 of cylinder 58. A threaded end portion 71 on the end of rod 68 receives a piston thrust nut 72. Seals 70 and 75 seal the end wall 69 against the body portion 56 and rod 68 respectively to maintain the sealed integrity of the body portion 56.

The ram which is housed within body portion 56 is comprised of a ram body 73 having an inner seal 74 with a concave surface 76 facing a vertical opening in the assembly. The inner seal 74 is fitted into a large slot 77 which is cut into the face of ram 73. The seal is maintained in position by screws, (not shown). Two narrower slots 78 and 78a are located in the face of each ram 73. Slots 78 mounts a pipe guide 79 maintained in position by screws (not shown). The other slot 78a provides a space into which the mating pipe guide 79 slides when the rams are closed.

Outer seal 81 is fitted into a saddle shaped slot in the top and sides of the ram body. This slot communicates with the inner seal slot 77, forming a continuous seal between the pipe passing through the vertical opening in the assembly and the body portion 56. A key 82 is assembled into the bottom of the ram to keep the ram from rotating and thereby maintaining proper orientation of the inner seal 74 and ram guide 79 with the pipe to be sealed. The key is held in place by a key screw 83. A "T" slot 84 is cut in the rear of each ram into which is inserted the piston thrust nut 72 to open and close the ram. The large end of piston 63 as well as rod 68 has a smooth finish to allow sliding through seals and a fine finish also on the bore in end wall 69 through which the rod 68 passes.

The lower pair of opposed rams are identical to those described above except that the assembly is inverted to place the outer seal 81 on the bottom of the assembly. This insures that a seal is maintained in the assembly between the top and bottom pairs of rams and in the sleeve 43 which is connected between the pairs of rams. The sleeve 43 is aligned with the openings in the ram assemblies to provide a full vertical opening through the assembly when the rams are open. When pipe is positioned in this vertical opening, closure of the rams about the pipe provides a sealed chamber about the pipe. This chamber is defined by the inner seals 76 on the top and bottom pairs of rams and the outer seals 81 which are on the top side of the upper rams and the bottom side of the lower rams. The seals 70 and 75 sealingly close the backs of the rams. A hydraulic fitting is placed in a port 44 provided in the wall of sleeve 43 to permit a testing fluid to be communicated with the interior sleeve 43.

Referring next to FIG. 3 of the drawings, the opposing rams 73 of one pair are shown closed about a pipe 19 with the inner seals 74 sealing about the pipe. The inner seals 74 are connected with outer seals 81 as shown in FIG. 2 on the partially cut away view of the lower ram where the rams are also shown closed on the pipe 19.

In the operation of the testing system described above as, for example, in a snubbing operation, the pipe testing system assembly 16 is assembled on top of a snubbing unit 12 as shown in FIG. 1. A section of pipe 17 to be run into the well is inserted into the assembly on top of the wellhead and passed downwardly into the well. Blowout preventors 52 are mainipulated accordingly to accommodate this operation. The pipe 17 is inserted in the well by unclamping lower slips 28 and operating the jack to move the traveling plate 24 and upper slips, which are clamped to the pipe 17, downwardly to force pipe 17 into the well. While the upper end of the first section of pipe is extending above the testing assembly 16, the next section of pipe 19 is threaded onto the section being inserted into the well. When the tool joint connection 21 is made up, the lower slips 28 are engaged with the pipe string, the upper slips are released, and the jack is raised upwardly along the pipe string until the made up pipe joint connection 21 is positioned within the sleeve 43, which forms a test chamber together with the upper and lower pairs of rams 36. When the pipe joint connection 21 is so positioned in the sleeve 43, as shown in FIG. 1, the rams 36 are actuated by means of spool valve 42 to close around the pipe and thus seal off the pipe above the below the pipe joint connection. A testing fluid such as water is then introduced under pressure into the sealed sleeve 43 about the pipe joint 21. Pressure decay is monitored on a gauge 23 to determine if a leak exists in the pipe joint. If no leak exists, rams 36 are opened, the lower slips 28 are released, and the jack is lowered to move the pipe into the well. This jacking operation is repeated until the next pipe joint connection is positioned in the test chamber formed by the sealed sleeve 43, whereupon the next connection is tested. If a connection is found to leak, the pipe is recoupled or removed from the string by reversing the jacking procedure and then retested.

While a particular embodiment of the present invention has been shown and described, it is apparent that changes and modifications may be made without departing from this invention in its broader aspects. Therefore, the aim in the appended claims is to cover all such changes and modifications as fall within the true spirit and scope of this invention.

I claim:

1. Apparatus capable of use for externally testing a pipe joint connecting two sections of pipe, comprising:
    upper hydraulic ram means having a transverse opening for receiving a pipe and seal means arranged to close about the pipe, said upper ram means including a pair of opposed hydraulic actuated pistons for operating said upper seal means;
    lower hydraulic ram means having a transverse opening for receiving a pipe and seal means arranged to close about the pipe, said lower ram means including a pair of opposed hydraulic actuated pistons for operating said seal means, said lower ram means being inverted relative to said first ram means; and
    chamber means mounted between said first and second ram means and connecting said transverse openings to form a testing chamber.

2. The apparatus of claim 1 further comprising flange means positioned below said lower hydraulic ram means and having an opening arranged for aligned communication with the transverse openings of said upper and lower ram means and connecting chamber means.

3. The apparatus of claim 2 wherein said flange means is provided with means for connecting said testing apparatus to the upper end of a well pipe.

4. The apparatus of claim 1 and further including port means for applying a fluid under pressure to the interior of said chamber means.

5. The apparatus of claim 4 and further including pipe guide means on said upper and lower hydraulic ram means and arranged to close about pipe passing through said testing chamber.

6. The apparatus of claim 1 wherein said chamber means is comprised of a tubular member of sufficient length to form a testing chamber that is greater in length than the pipe joint being tested.

7. Apparatus of claim 1 further including gauge means for monitoring the pressure in said chamber.

8. A method for externally testing a pipe joint connection between sections of pipe for passing into a wellhead, and utilizing blowout preventor hydraulic ram assemblies, comprising the steps of:
    connecting a tubular member between two blowout preventor hydraulic ram assemblies so that the tubular member is longitudinally aligned with a pipe opening in each of the ram assemblies to form a chamber about the pipe when the rams are closed, inverting the lower blowout preventor ram assembly so that ram assemblies connected by the tubular member form a closed chamber within the tubular member when the rams are closed about pipe extending through the ram assemblies and tubular member;
    providing a port in the tubular member to permit the passing of a hydraulic fluid under pressure into the chamber;
    passing a pipe joint connection through one of the ram assemblies and into the connecting tubular member with the pipe extending each way from the joint being positioned within the pipe openings in the ram assemblies;
    passing a fluid under pressure into the port in the tubular member; and
    detecting changes in the pressure of the fluid to determine if the pipe joint is leaking.

9. The method of claim 8 and further including:
    connecting the ram assemblies and connecting tubular member to a wellhead so that the tubular member and pipe openings in the ram assemblies are aligned with the well; and
    passing additional pipe joint connections into the chamber for external pressure testing as pipe is passed into the well.

10. The method of claim 8 and further including operating each of the hydraulic rams simultaneously to close the chamber.

11. Apparatus capable of use in externally testing a pipe joint connection comprising:
    first ram type blowout preventor means positioned above the well with a pipe opening in the first blowout preventor means aligned with the top of the well;
    second ram type blowout preventor means positioned below said first blowout preventor means and above the well, with a pipe opening therein aligned with the top of the well and with the pipe opening in said first blowout preventor means, said second blowout preventor means being inverted relative to said first blowout preventor means;
    tubular sleeve means extending between said first and second blowout preventor means and having its longitudinal axis aligned with the pipe openings in said first and second blowout preventor means; and
    a port in said tubular sleeve means to permit a fluid to be introduced into said sleeve means.

12. The apparatus of claim 11 wherein the rams in said first and second blowout preventor means each have inner and outer seals, with said inner seals arranged for closing about a pipe extending through said pipe opening, and said outer seal arranged to seal one side of the side wall of the ram in the blowout preventor from the pipe opening so that one side of the inner seal is not in fluid communication with the other side of the inner seal through a path around the ram when the inner seal is closed about a pipe, said inner and outer seals being connected.

13. The apparatus of claim 12 wherein the second blowout preventor means is arranged so that the outer seal is positioned on the lower side of the ram, and the first blowout preventor is arranged so that the outer seal is positioned on the upper side of the ram.

14. The apparatus of claim 12 wherein the outer seals are positioned on the side of the ram away from the connecting tubular sleeve means.

* * * * *